United States Patent
Wachauer

(10) Patent No.: US 6,749,532 B2
(45) Date of Patent: Jun. 15, 2004

(54) ELECTRIC DRIVE FOR A VEHICLE

(76) Inventor: Oskar Wachauer, Radmer 39a, A-8795 Hieflau (AT)

( * ) Notice: Subject to any disclaimer, the term of this patent is extended or adjusted under 35 U.S.C. 154(b) by 0 days.

(21) Appl. No.: 10/181,422

(22) PCT Filed: Jan. 26, 2001

(86) PCT No.: PCT/AT01/00019
§ 371 (c)(1),
(2), (4) Date: Jul. 24, 2002

(87) PCT Pub. No.: WO01/56138
PCT Pub. Date: Aug. 2, 2001

(65) Prior Publication Data
US 2003/0010547 A1 Jan. 16, 2003

(30) Foreign Application Priority Data
Jan. 28, 2000 (AT) ................................................. 133/00

(51) Int. Cl.⁷ .............................................. F16H 37/06
(52) U.S. Cl. ........................... 475/5; 475/332; 475/151; 180/65.6; 180/65.7
(58) Field of Search ............................... 180/65.6, 65.7, 180/297; 475/5, 6, 151, 332, 330, 338; 74/421 A, 413; 310/115

(56) References Cited

U.S. PATENT DOCUMENTS

| | | | |
|---|---|---|---|
| 516,917 A | | 3/1894 | Coleman |
| 613,894 A | | 11/1898 | Sherrin |
| 1,348,539 A | | 8/1920 | Breitenbach |
| 2,027,218 A | * | 1/1936 | Armington .................... 74/664 |
| 2,868,037 A | * | 1/1959 | Hindmarch ............. 475/338 X |
| 3,267,311 A | | 8/1966 | Lamparty |
| 3,693,745 A | * | 9/1972 | Petrov .......................... 180/60 |
| 3,944,010 A | * | 3/1976 | Winter et al. ................. 180/55 |
| 4,130,172 A | | 12/1978 | Moody |
| 5,263,905 A | * | 11/1993 | Van Dest ..................... 475/89 |
| 5,275,248 A | * | 1/1994 | Finch et al. ............... 180/65.6 |
| 5,487,438 A | | 1/1996 | Kinoshita |
| 5,804,935 A | | 9/1998 | Radev |
| 5,845,732 A | | 12/1998 | Taniguchi et al. |
| 5,919,109 A | * | 7/1999 | Fleckenstein ............... 475/151 |

FOREIGN PATENT DOCUMENTS

| | | | | |
|---|---|---|---|---|
| AT | 405924 | | 12/1999 | |
| DE | 19905447 | | 12/1999 | |
| EP | 0587120 | | 3/1994 | |
| EP | 0867324 | | 9/1998 | |
| GB | 2008862 | | 6/1979 | |
| GB | 2254965 | | 10/1992 | |
| JP | 50151315 | | 12/1975 | |
| JP | 360095238 | * | 5/1985 | .................... 475/6 |
| WO | 99/36286 | | 7/1999 | |

OTHER PUBLICATIONS

Patent Abstracts of Japan vol. 001, No. 112 & JP 52 045009.

* cited by examiner

*Primary Examiner*—Ha Ho
(74) *Attorney, Agent, or Firm*—Greenblum & Bernstein, P.L.C.

(57) ABSTRACT

Electric drive for a vehicle includes a housing that is stationary in relation to a vehicle chassis or frame. A motor housing is arranged in the housing. A stator and a rotor are arranged in the motor housing. The rotor and the stator are rotatably mounted. The motor housing and the rotor are capable of rotating in opposite directions. A first drive train is connected to one of the rotor and the motor housing. A first transmission device connects one of the rotor and the motor housing to the first drive train whereby the first drive train produces a first output rotation. A second drive train connects to another of the rotor and motor housing. A second transmission device connects another of the rotor and the motor housing to the second drive train whereby the second drive train produces a second output rotation. Each of the first and second transmission devices includes a planetary gear.

27 Claims, 3 Drawing Sheets

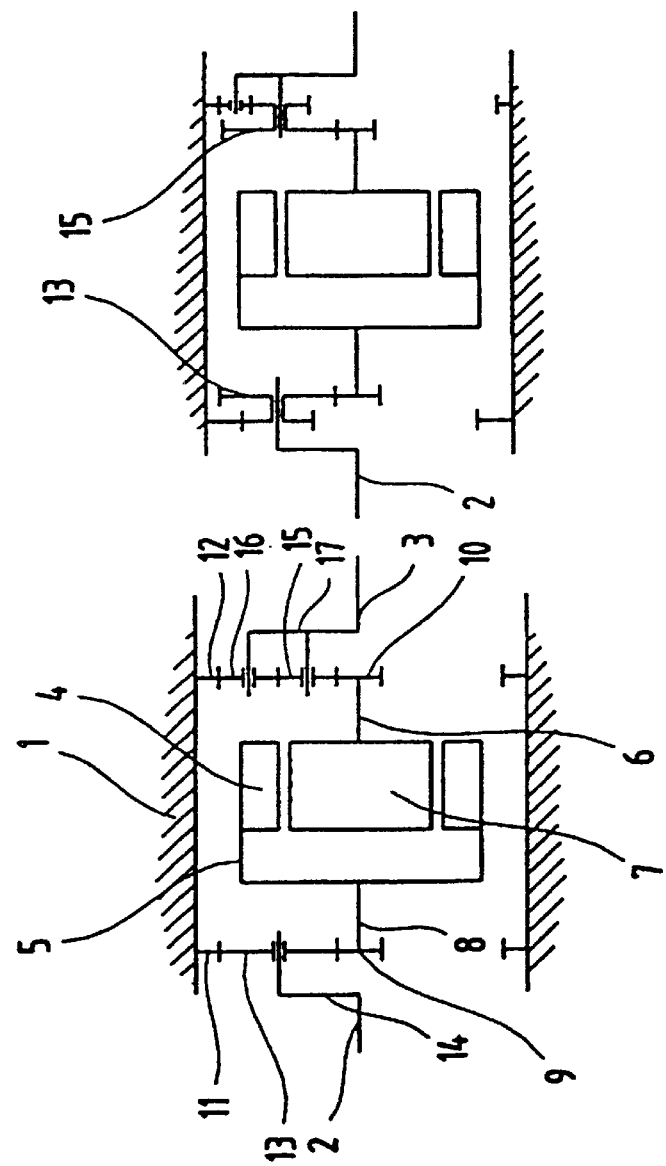

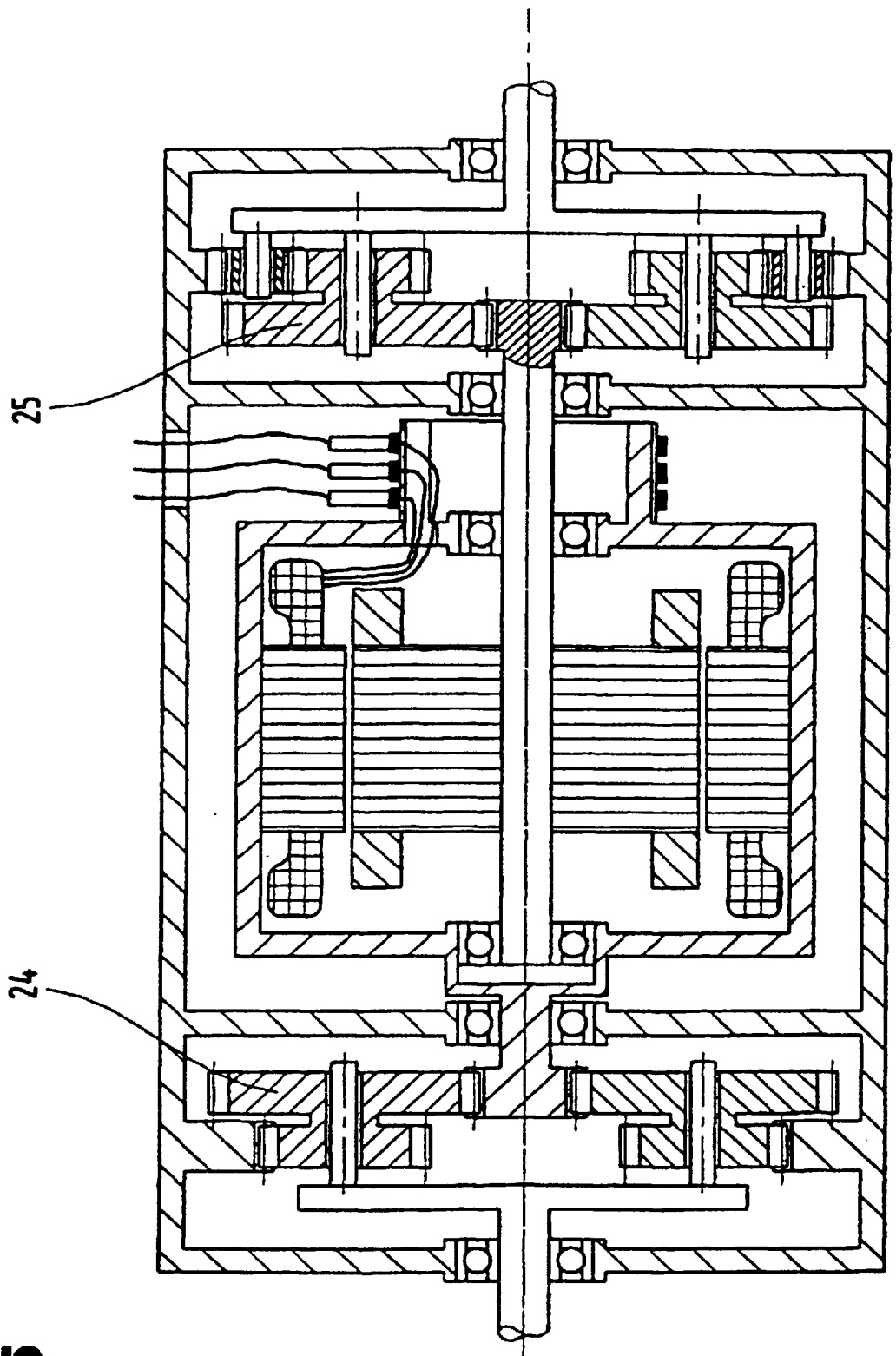

ELECTRIC DRIVE FOR A VEHICLE

CROSS-REFERENCE TO RELATED APPLICATIONS

The present application is a National Stage Application of International Application No. PCT/AT01/00019, filed Jan. 26, 2001. Further, the present application claims priority under 35 U.S.C. §119 of Austrian Patent Application No. A133/00 filed on Jan. 28, 2000.

BACKGROUND OF THE INVENTION

1. Field of the Invention

The invention relates to an electric drive for vehicles.

2. Discussion of Background Information

U.S. Pat. No. 516,917 A describes an electric drive that is used for driving two wheels independently, whereby one wheel is connected to the field winding so as to be stationary in relation to the winding, and the other wheel is connected to the rotor via a differential gear. In order to achieve an equal torque on both wheels the differential gear must, with the field winding and rotor running at the same speed, effect a reverse in the direction of rotation of the rotor only, without changing the speed. This is the case in the embodiments shown, on the one hand as a differential gear ring similar to the arrangement in known axle differentials, on the other hand as a spur pinion-planetary gear with the same function.

Furthermore, U.S. Pat. No. 613,894 describes a dynamo and electric drive for vehicles. In this embodiment with two electric components capable of coaxial rotation, the two components are connected to each other by a gear unit with high speed reducing ratio, and to a stationary part. In one embodiment, it is suggested that the housing of the rotating field winding should be connected to a drive wheel of the vehicle so as to be stationary in relation to the wheel. In a further embodiment, the internal shaft is to be used as a drive for slow-running machines.

Furthermore, a device with a rotating field winding is known, whereby current is supplied to the field winding via slip rings. The equally rotating rotor drives the housing of the field winding via a planetary gear with a high speed-increasing ratio. As in U.S. Pat. No. 613,894 A, this unit is used preferably for slow-running machines, for example as a drum drive for winches, whereby the entire drive has room within the drum.

A drive train for an electric vehicle is also described in U.S. Pat. No. 5,845,732 A. Thereby, one drive shaft is connected to a rotor that is arranged coaxially with the wheel shafts, whereby the rotor is mounted on a hollow shaft and drives the sun gear of a planetary gear. The web of this gear is connected to a wheel shaft that runs through the hollow rotor shaft. The ring gear of the gear is connected to the web of another planetary gear that is arranged coaxially with the rotor shaft. This gear has to effect a torque reversal so that the second wheel shaft, to which it is connected, rotates in the same direction as the first wheel shaft. The disadvantage of this embodiment is the need for a hollow shaft to accommodate the rotor.

U.S. Pat. No. 5,487,438 and EP 0 587 120 A3 describe a drive system for an electric vehicle. Within the scope of this drive system, an axle drive is shown in which the field winding, which is mounted so as to be capable of rotation and which is supplied via slip rings, is connected to the pinion of a gear unit. This pinion engages with a ring gear which in turn is connected to one of the wheel shafts so as to be stationary in relation to the shaft. In this gear unit, the pinion and the ring gear rotate in the same direction. The rotor, which is also mounted so as to be capable of rotation, drives a spur pinion that engages with another spur pinion that is connected to the other wheel shaft. This gear unit effects rotation of the wheel shaft in the opposite direction in relation to rotation of the rotor. The function of a differential gear is thus provided. With a suitable choice of gear wheel diameters, the wheel shafts can be aligned. The disadvantage of this embodiment is the fact that the field winding and the rotor rotate around an additional axle parallel to the wheel shafts, thus increasing the costs of construction of the housing. Furthermore, the intended high speed-increasing ratios require a large diameter for the ring gear of the gear unit, which reduces the ground clearance of vehicles with such an axle to a level that is not permissible.

U.S. Pat. No. 5,804,935 describes a drive system for electric vehicles.

This drive system is intended for vehicles with two driven axles, whereby a field winding that is mounted so as to be capable of rotation drives one wheel axle. With suitable devices, this drive train can be interrupted and the field winding can be fixed to the vehicle while the drive axle runs freely. Furthermore, a rotor is provided that drives the other drive axle. The current for the rotating field winding is provided via slip rings. The rotary movement of the rotor or field winding is transmitted directly to the connecting shaft to the drive axles. Under the condition that the rotor has the same rpm with reference to the stator, it is possible with the help of this device, with a fixed rotor and driving only one wheel axle, to achieve twice the driving speed as when driving both axles. In addition to the suitability of such a drive device only for vehicles with two driven wheel axles, a reduction gear must also be provided for each wheel axle in order to achieve a reasonable embodiment in terms of construction.

GB 2 008 862 A describes a double rotor with friction brakes.

A device is described in which both the field winding and the rotor are independently mounted on a joint axle so as to be capable of rotation and which can be fixed by means of friction brakes. Current is transmitted via slip rings. The rotational movement of the rotor and the field winding are superimposed in a suitable planetary gear unit. Downstream from this unit, there is a reduction gear for driving primarily a winch drum. By arresting the rotor or field windings, great differences in the rpm of the winch drum can be achieved, thus improving the handling of the relevant hoisting device or of a machine with similar specifications.

Furthermore, GB 2 254 965 A describes a gear system for vehicles driven by an electric motor. A device is proposed in which both the rotor and the field winding of a direct current unit are mounted on a mutual axle so as to be capable of rotation. Thereby, the rotor shaft is mounted on the vehicle so as to be capable of rotation at one end, and in the rotating housing of the field winding at the other end. The rotating housing of the field winding has a shaft stump at one end that is mounted on the vehicle. At the other end, the housing is mounted on the rotor shaft. The operating current is transmitted by slip rings that are mounted on the outer diameter of the housing of the field winding. The rotor has a collector that is supplied via rotating brushes connected to the housing.

U.S. Pat. No. 4,130,172 A describes an electric vehicle. In this disclosure, an electric motor drive system is described whereby the rotor and the field winding are arranged on a common axle so as to be able to rotate, whereby the direction of rotation of one of the output shafts is reversed with reference to the rotor movement by a bevel gear. The other output shaft is fixed rigidly to the rotation of the field winding. Since the described embodiment does not perform a reduction in rpm of the output shafts with reference to rotor and field coil, the drive wheels of the vehicle must be connected to the respective output shafts by means of a belt drive.

AT 405 924 B describes an electric drive for vehicles. This disclosure shows that the opposite direction of movement of rotor and field winding can be reduced to the wheel rpm either in the same or in opposite directions with a suitable planetary gear device, thus fulfilling the function of a gear drive with differential function. With the described gear units, rotor, field winding and wheel shafts can be arranged on one axis of rotation.

An axle drive for a vehicle is also known, whereby the rotor and the field winding are mounted so as to be capable of rotation and drive one wheel each. Both the main and the excitation current are supplied to the moving motor parts via an appropriately arranged slip ring transmission device. The necessary reduction to the rpm of the drive wheels is achieved with a two-step spur pinion unit for both the rotor and the field winding. An idler gear is inserted in one of these gears, thus achieving an opposite direction of rotation of the drive and output in this train. With a suitable choice of the spur pinions for this gear unit, it is possible to have the wheel shafts and the rotor-field winding assembly on one common axle.

Furthermore, EP 0 867 324 A2 describes a vehicle, in particular a fork lift truck, that can be operated by an electric motor with stator and rotor rotating in opposite directions. In this disclosure, an axle drive device for floor conveyors is described whereby one wheel is driven by the rotating stator via a reduction gear and the other wheel is driven by the rotor via a spur pinion for reversal of direction as well as by a further reduction gear. With the functional separation between rpm reversal and reduction to wheel rpm, the cost of construction for two separate reduction gears is necessary in addition to the reversing mechanism.

Furthermore, U.S. Pat. No. 3,267,311 A describes a combination of an electric motor and a differential drive for a vehicle. The axle drive for the vehicle consists of a rotating field winding that is connected rigidly to one wheel, and a rotor rotating on the same axle that is connected to the other wheel via a gear unit. The gear unit consists of a spur pinion connected to the rotor, which engages with idler gears. The axes of rotation of the idlers are fixed in relation to the housing and in turn engage with a ring gear that is arranged coaxially with the rotor axle. With this gear unit, a reversal of direction between rotor and wheel shaft is achieved. Since this gear also effects a speed reduction that is not negligible, the torques on the left and right wheel are necessarily different. Therefore and because of the lower speed reduction between the electric motor components and the drive wheels, the suitability of this combination for motor drives is questionable.

SUMMARY OF THE INVENTION

The aim of this invention is to provide an electric drive that avoids the disadvantages of the above mentioned drives on the one hand, and that is easy to construct on the other hand.

The aim of this invention is achieved with an electric drive for a vehicle, in particular for a multi-track electric motor vehicle, whereby a housing that is stationary in relation to the vehicle chassis or frame is provided and a motor housing with a stator and a rotor, which are rotationally mounted within this motor housing, is provided. The motor housing and the rotor perform opposite rotational movements for output, whereby a drive train is connected to the rotor or to the motor housing and the rotational movement of the rotor or the motor housing is carried out by way of a transmission device with the same drive and output direction of rotation. The remaining drive train is connected to the motor housing or the rotor and the rotational movement of the motor housing or rotor is carried out by way of a transmission device with opposite drive and output direction of rotation, wherein the rotor engages with the planet wheels of the allocated planetary gear by way of a spur pinion that is arranged on the shaft or the motor housing engages with the planet wheels of the allocated planetary gear by way of a spur pinion that is connected to the motor housing and is arranged on the axis of the motor housing. A web is provided that is connected to the axles of the planet wheels of each planetary gear and drives the wheel shaft assigned thereto.

The surprising advantage resulting from the features mentioned above must be seen primarily in the fact that a high speed increase for an electric motor is achieved in one gear step. According to the state of the art, such a high speed increase can normally be achieved only with a three-step spur pinion. Furthermore, the invention offers the benefit of an even torque distribution between the two wheel shafts. The reversing gear, where drive and output are arranged coaxially, makes a compact construction of the drive possible. In such a gear, the torque is transmitted by several sets of planet wheels for each gear. With the resulting optimal branching of output, a compact construction is possible.

A further advantage of the invention lies in the fact that by connecting the bridge to the wheel shafts the circumference speeds of the planetary wheels are lower and thus there are lower centrifugal forces.

With this drive according to the invention, a hollow shaft through the rotor with a complicated bearing mounting is not required to operate the opposite wheel shaft.

The invention also makes it possible to construct the entire gear unit to fit the diameter of the motor housing. This results in favorable assembly dimensions for production engineering, which in turn guarantees a good or high ground clearance with reference to the vehicle design.

The invention also makes it possible to guarantee a simple construction allowing an economic production of the entire drive system.

It is also possible to design a drive that is arranged between the left and right drive wheel, which provides the differential function, and thereby requires so little space that a rigid coaxial connection between the wheel axles and the drive is possible without reducing the ground clearance of the vehicle to a level that is not permissible.

Another significant advantage of the drive system in accordance with the invention is the fact that when the vehicle is driving straight ahead the rotor rpm is approximately the same as the stator rpm. As is known, the sum of the speeds is important for the output capacity. The noise level, on the other hand, depends on the maximum rpm occurring in the system. The drive system In a further embodiment of the invention, speed increases can be achieved that can meet the required specifications optimally.

The invention also provides for an electric drive for a vehicle, comprising a housing that is stationary in relation to a vehicle chassis or frame. A motor housing is arranged in the housing. A stator and a rotor are arranged in the motor housing. The rotor and the stator are rotatably mounted. The motor housing and the rotor are capable of rotating in opposite directions. A first drive train connects to one of the rotor and the motor housing. A first transmission device connects one of the rotor and the motor housing to the first drive train whereby the first drive train produces a first output rotation. A second drive train connects to another of the rotor and motor housing. A second transmission device connects another of the rotor and the motor housing to the second drive train whereby the second drive train produces a second output rotation. Each of the first and second transmission devices comprise a planetary gear. The electric drive also includes at least one of: the rotor comprising a shaft and a spur gear arranged on the shaft wherein the spur gear engages with planet wheels of the planetary gear; and the motor housing is connected to a spur gear wherein the spur gear engages with planet wheels of the planetary gear, and at least one web is connected to axles of the planet wheels of a planetary gear. The at least one web drives one of the first and the second drive train.

The vehicle may comprise a multi-track electric motor vehicle. The planet wheels may comprise stepper gears. The rotor may comprise a shaft and a spur gear arranged on the shaft wherein the spur gear engages with idlers of the planetary gear. The idlers may comprise stepper gears. The motor housing may be connected to a spur gear and wherein the spur gear engages with idlers of the planetary gear. The idlers may comprise stepper gears.

The invention also provides for an electric drive for a vehicle, comprising a main housing. A rotatably mounted motor housing is arranged in the main housing. A stator and a rotor are arranged in the motor housing. The rotor and the stator are rotatably mounted within the main housing. The motor housing and the rotor are capable of rotating in opposite directions. A first drive train is caused to rotate by the rotor. A first transmission device connects the rotor to the first drive train whereby the first drive train produces a first output rotation. A second drive train is caused to rotate by the motor housing. A second transmission device connects the motor housing to the second drive train whereby the second drive train produces a second output rotation. Each of the first and second transmission devices comprise respective first and second planetary gears. The rotor is coupled to a shaft and a first spur gear is arranged on the shaft wherein the first spur gear engages with planet wheels of the first planetary gears. The motor housing is coupled to a second spur gear wherein the second spur gear engages with planet wheels of the second planetary gears. A first connecting mechanism connects axles of the first planetary gears to the first drive train. A second connecting mechanism connects axles of the second planetary gears to the second drive train.

The vehicle may comprise a multi-track electric motor vehicle. Each of the first and second planetary gears comprise planet wheels. The planet wheels may comprise stepper gears. The first spur gear may engage with idlers of the first planetary gears. The idlers may comprise stepper gears. The second spur gear may engage with idlers of the second planetary gears. The idlers may comprise stepper gears. Each of the first and second drive trains may be rotatably mounted to the main housing via bearings. Each of the rotor and the motor housing may be rotatably mounted to the main housing via bearings.

The invention also provides for an electric drive for a vehicle, comprising a main housing. A rotatably mounted motor housing is arranged in the main housing. A stator is mounted within the motor housing. A rotor is rotatably mounted in the motor housing. The motor housing and the rotor are capable of rotating in opposite directions. A first drive train is caused to rotate by the rotor. A first transmission device couples the rotor to the first drive train whereby the first drive train produces a first output rotation. A second drive train is caused to rotate by the motor housing. A second transmission device couples the motor housing to the second drive train whereby the second drive train produces a second output rotation. Each of the first and second transmission devices comprise respective first and second planetary gears. A first spur gear is coupled to the rotor wherein the first spur gear engages with planet wheels of the first planetary gears. A second spur gear is coupled to the motor housing wherein the second spur gear engages with planet wheels of the second planetary gears. The rotation of the rotor causes a rotation of the first drive train and the rotation of the motor housing causes rotation of the second drive train.

The first drive train may be coupled to the planet wheels of the first planetary gears. The second drive train may be coupled to the planet wheels of the second planetary gears. The electric drive may further comprise a first connecting mechanism that connects axles of the first planetary gears to the first drive train and a second connecting mechanism that connects axles of the second planetary gears to the second drive train.

BRIEF DESCRIPTION OF THE DRAWINGS

In the following, the invention is explained in more detail based on the embodiments illustrated in the figures wherein:

FIG. 1 shows a schematic illustration of the drive;

FIG. 2 shows a schematic illustration of the drive, whereby the planet wheels are embodied as stepper gears;

FIG. 3 shows a schematic illustration of the drive in accordance with a further embodiment;

FIG. 5 shows a cross-section of a further embodiment of the electric drive.

DETAILED DESCRIPTION OF THE INVENTION

Figure 4:
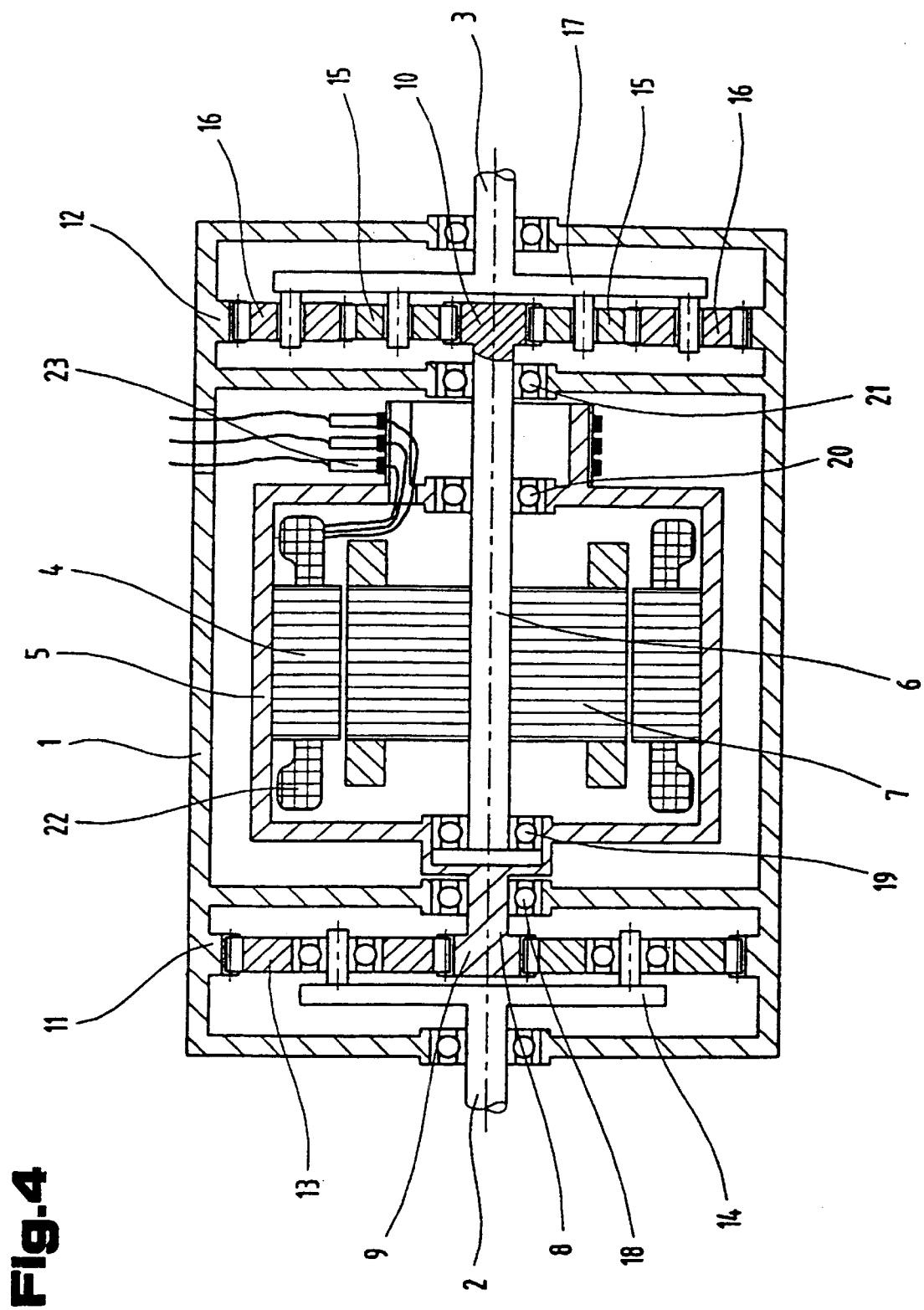
FIG. 4 shows a cross-section of an electric drive.

By way of introduction, it is noted that in the various embodiments described the same parts are allocated the same reference numbers and the same component names, whereby the disclosures contained throughout the description can be applied by analogy to the same parts with the same reference numbers or same component names. Furthermore, position details given in the description, e.g. top, bottom, side, etc., relate to the figure being described and illustrated at the time and with a change of position should be transferred accordingly to the new position. Moreover, individual features or combinations of features from the different embodiments illustrated and described can represent independent inventive solutions or solutions according to the invention in themselves.

The problem forming the basis of the separate solutions according to the invention can be taken from the description.

As shown in FIG. 1, the electric drive utilizes a housing 1 that is stationary with reference to the vehicle, from which a first drive train 2 and a second drive train 3 protrude on both sides. The torque for the first drive train 2 is applied by a stator 4 that is mounted in a motor housing 5, and the torque for the second drive train 3 is applied by a shaft 6 from a rotor 7 that is mounted on bearings so as to be capable of rotation. The motor housing 5 is fixed to a shaft stump 8 from the first drive train 2, whereby the shaft stump 8 has a spur pinion 9 at its free end. Equally, the shaft 6 has a spur pinion 10 at its free end. Between the drive trains 2, 3 and the spur pinions 9, 10, there is a gear unit each, embodied as a planetary gear.

Inside the stationary housing 1, within which the whole drive is integrated, a ring gear 11, 12 is arranged for each of the planetary gears. These ring gears 11, 12 could also be referred to as sun gears, since their axles are in the main axle of the drive. In the gear unit for drive train 2, the planet wheels 13 are engaged with the ring gear 11 and the spur pinion 9. A web 14 is connected to the axles of the planet wheels 13, which drives the drive train 2 and subsequently the respective wheel shaft.

In order to achieve a reversal of direction for a drive used for a vehicle, idlers 15 are arranged in the gear unit for drive train 3, which is also embodied as a planetary gear, and these idlers 15 are meshed with the spur pinion 10 on the one hand and the planet wheels 16 on the other hand, whereby the planet wheels 16 engage with the ring gear 12. The axles of the idlers 15 and the axles of the planet wheels 16 are carried by a web 17, which drives the drive train 3 and subsequently the respective wheel shaft. Of course the planetary gear for drive train 2 could also have the idlers 15 and the planetary gear for drive train 3 could have planet wheels 16 that mesh directly with the ring gear 12 and the spur pinion 10.

FIG. 2 shows a schematic illustration of a gear unit for a drive system, whereby the basic structure of the drive is the same as the drive in accordance with FIG. 1. In this drive, the planetary gear for drive train 2 has planet wheels 13 that are embodied as stepper gears. Equally, the idlers 15 of the corresponding gear unit are embodied as stepper gears. With such a gear embodiment, it is possible to increase the speed-increase ratio.

FIG. 3 again shows a drive with the same basic configuration as the drive in FIG. 1. Thereby, the planet wheels 16 for the drive train 3 could be embodied as stepper gears, whereby the idlers 15 are of a conventional embodiment. With a suitable choice of tooth ratios for the planetary gears, the torque in the wheel shafts allocated to the drive trains can be defined, whereby the rotational movement of the wheel shafts is completely independent.

In accordance with FIG. 4, the electric drive has a fixed housing 1 whereby the freely rotating motor housing 5, in which the stator 4 of the electric motor is mounted, is supported above the shaft stump 8 by way of roller bearings 18. The shaft stump 8, which is fixed to the motor housing 5, has a spur pinion 9. In the motor housing 5, the rotor 7 with its shaft 6 is supported on bearings 19 or 20. The spur pinion 10 is provided at one end of the shaft 6. The shaft 6 can also be supported in the fixed housing 1 by further rolling bearings 21.

Of course the arrangement of the gear units could also be switched without any loss of function.

With the gear arrangement shown in FIG. 5, a further increase in the speed-increase ratio can be achieved. The basic structure of the drive is equivalent to the drive shown in FIG. 4. The planet wheels 13 and idlers 15 shown in FIG. 4 are embodied as stepper gears 24 and 25 in FIG. 5. Otherwise, the function is exactly the same.

Here, too, it is possible to reverse the gear units.

For form's sake, it is noted that for a better understanding of the structure of the device, the device and its components are illustrated partly untrue to scale and/or are enlarged and/or made smaller.

LIST OF REFERENCE NUMBERS

| |  |
|---|---|
| 1 | Housing |
| 2 | Drive train |
| 3 | Drive train |
| 4 | Stator |
| 5 | Motor housing |
| 6 | Shaft |
| 7 | Rotor |
| 8 | Shaft stump |
| 9 | Spur pinion |
| 10 | Spur pinion |
| 11 | Ring gear |
| 12 | Ring gear |
| 13 | Planet wheel |
| 14 | Web |
| 15 | Idler |
| 16 | Planet wheel |
| 17 | Web |
| 18 | Rolling bearing |
| 19 | Bearing |
| 20 | Bearing |
| 21 | Rolling bearing |
| 22 | Field winding |
| 23 | Slip contact |
| 24 | Stepper gear |
| 25 | Stepper gear |

What is claimed is:

1. An electric drive for a vehicle, comprising:

a housing that is stationary in relation to a vehicle chassis or frame;

a motor housing arranged in the housing;

a stator and a rotor arranged in the motor housing;

the rotor and the stator being rotatably mounted;

the motor housing and the rotor being capable of rotating in opposite directions;

a first drive train connected to one of the rotor and the motor housing;

a first transmission device connecting one of the rotor and the motor housing to the first drive train whereby the first drive train produces a first output rotation;

a second drive train connected to another of the rotor and the motor housing;

a second transmission device connecting said another of the rotor and the motor housing to the second drive train whereby the second drive train produces a second output rotation;

each of the first and second transmission devices comprising planet wheels;

at least one of:

the rotor comprising a shaft and a spur gear arranged on the shaft wherein the spur gear causes rotation of the planet wheels of either of the first and second transmission devices; and the motor housing connected to a spur gear wherein the spur gear engages with the planet wheels of either of the first and second transmission devices;

a first web directly connected to axles of the planet wheels of the first transmission device; and a second web connected to axles of the planet wheels of the second transmission device, wherein the first and second webs drive the first and the second drive trains.

2. The electric drive of claim 1, wherein the vehicle comprises a multi-track electric motor vehicle.

3. The electric drive of claim 1, wherein at least some of the planet wheels comprise stepper gears.

4. The electric drive of claim 1, wherein the rotor comprises the shaft and the spur gear arranged on the shaft wherein the spur gear engages with idlers.

5. The electric drive of claim 4, wherein the idlers comprise stepper gears.

6. The electric drive of claim 1, wherein the motor housing is connected to the spur gear and wherein the spur gear engages with idlers.

7. The electric drive of claim 6, wherein the idlers comprise stepper gears.

8. An electric drive for a vehicle, comprising:
a main housing;
a rotatably mounted motor housing arranged in the main housing;
a stator and a rotor arranged in the motor housing;
the rotor and the stator being rotatably mounted within the main housing;
the motor housing and the rotor being capable of rotating in opposite directions;
a first drive train being caused to rotate by the rotor;
a first transmission device connecting the rotor to the first drive train whereby the first drive train produces a first output rotation;
a second drive train being caused to rotate by the motor housing;
a second transmission device connecting the motor housing to the second drive train whereby the second drive train produces a second output rotation;
the first transmission device comprising a first planetary gear;
the second transmission device comprising a second planetary gear;
the rotor being coupled to a shaft and a first spur gear being arranged on the shaft wherein the first spur gear causes rotation of planet wheels of the first planetary gear;
the motor housing being coupled to a second spur gear wherein the second spur gear engages with planet wheels of the second planetary gear;
a first connecting mechanism that connects axles of the first planetary gear to the first drive train; and
a second connecting mechanism that connects axles of the second planetary gear, to the second drive train.
wherein the planet wheels of both the first and second planetary gears rotate around an axis running through at least one of:
the first and second spur gears; and
the rotor and the motor housing 9. The electric drive of claim 8, wherein the vehicle comprises a multi-track electric motor vehicle.

10. The electric drive of claim 8, wherein at least some of the planet wheels comprise stepper gears.

11. The electric drive of claim 8, wherein the first spur gear engages with idlers of the first planetary gear.

12. The electric drive of claim 11, wherein the idlers comprise stepper gears.

13. The electric drive of claim 8, wherein the second spur gear engages with idlers of the second planetary gear.

14. The electric drive of claim 13, wherein the idlers comprise stepper gears.

15. The electric drive of claim 8, wherein each of the first and second drive trains are rotatably mounted to the main housing via bearings.

16. The electric drive of claim 8, wherein each of the rotor and the motor housing are rotatably mounted to the main housing via bearings.

17. An electric drive for a vehicle, comprising:
a main housing;
a rotatably mounted motor housing arranged in the main housing;
a stator mounted within the motor housing;
a rotor rotatably mounted in the motor housing;
the motor housing and the rotor being capable of rotating in opposite directions;
a first drive train being driven to rotate by the rotor;
a first transmission device coupling the rotor to the first drive train whereby the first drive train produces a first output rotation;
a second drive train being driven to rotate by the motor housing;
a second transmission device coupling the motor housing to the second drive train whereby the second drive train produces a second output rotation;
each of the first and second transmission devices comprising respective first and second planetary gears;
a first spur gear being coupled to the rotor wherein the first spur gear engages with planet wheels of the first planetary gear; and
a second spur gear being coupled to the motor housing wherein the second spur gear engages with planet wheels of the second planetary gear,
wherein rotation of the rotor causes a rotation of the first drive train and wherein rotation of the motor housing causes rotation of the second drive train, and
wherein the planet wheels of both the first and second planetary gears rotate around an axis running through at least one of:
the first and second spur gears; and
the rotor and the motor housing.

18. The electric drive of claim 17, wherein the first drive train is coupled to the planet wheels of the first planetary gear.

19. The electric drive of claim 17, wherein the second drive train is coupled to the planet wheels of the second planetary gear.

20. An electric drive for a vehicle, comprising:
a main housing;
a rotatably mounted motor housing arranged in the main housing;
a stator mounted within the motor housing;
a rotor rotatably mounted in the motor housing;
the motor housing and the rotor being capable of rotating in opposite directions;
a first drive train being driven to rotate by the motor housing;
a first transmission device coupling the motor housing to the first drive train whereby the first drive train produces a first output rotation;
a second drive train being driven to rotate by the rotor;
a second transmission device coupling the rotor to the second drive train whereby the second drive train produces a second output rotation;
each of the first and second transmission devices comprising respective first and second planetary gears;
a first spur gear being coupled to the motor housing wherein the first spur gear engages with planet wheels of the first planetary gear;
a second spur gear being coupled to the rotor wherein the second spur gear causes rotation of planet wheels of the second planetary gear;

a first connecting mechanism that connects axles of the first planetary gear to the first drive train; and a second connecting mechanism that connects axles of the second planetary gear to the second drive trains, wherein rotation of the rotor causes a rotation of the second drive train and wherein rotation of the motor housing causes rotation of the first drive train, and wherein the planet wheels of both the first and second planetary gears rotate around an axis running through at least one of:

the first and second spur gears; and the rotor and the motor housing.

21. An electric drive for a vehicle, comprising:

a stationary main housing;

a motor housing arranged in the main housing;

a stator and a rotor arranged in the motor housing;

the rotor being rotatably mounted to the motor housing at two spaced locations arranged on opposite sides of the stator;

the motor housing being rotatably mounted to each of the main housing and the rotor;

the motor housing and the rotor being capable of rotating in opposite directions;

a first drive train connected to the motor housing via a first transmission device;

a second drive train connected to the rotor via a second transmission device;

each of the first and second transmission devices comprising planet wheels;

a first spur gear rotating with the motor housing and engaging with the planet wheels of the first transmission device; and a second spur gear rotating with the rotor and engaging with the planet wheels of the second transmission device, wherein and the planet wheels of both the first and second transmission devices rotate around a common axis running through the rotor and the motor housing.

22. The electric drive of claim 21, axles of the planet wheels of the first transmission device are connected to the first drive train and wherein axles of the planet wheels of the second transmission device are connected to the second drive train.

23. The electric drive of claim 21, wherein axles of the planet wheels of the first transmission device are connected to a web of the first drive train and wherein axles of the planet wheels of the second transmission device are connected to a web of the second drive train.

24. A method of driving a vehicle using the electric drive of claim 1, wherein the method comprises:

arranging the housing in the vehicle in a stationary manner;

rotatably mounting the first and second drive trains to the housing; and rotating the rotor and the stator in opposite directions, wherein rotation of the rotor and the stator causes the first and second drive trains to rotate.

25. A method of driving a vehicle using the electric drive of claim 8, wherein the method comprises:

arranging the main housing in the vehicle in a stationary manner;

rotatably mounting the first and second drive trains to the main housing; and rotating the rotor and the stator in opposite directions, wherein rotation of the rotor and the stator causes the first and second drive trains to rotate.

26. A method of driving a vehicle using the electric drive of claim 17, wherein the method comprises:

arranging the main housing in the vehicle in a stationary manner;

rotatably mounting the first and second drive trains to the main housing; and rotating the rotor and the stator in opposite directions, wherein rotation of the rotor and the stator causes the first and second drive trains to rotate.

27. A method of driving a vehicle using the electric drive of claim 21, wherein the method comprises:

arranging the main housing in the vehicle in a stationary manner;

rotatably mounting the first and second drive trains to the main housing; and rotating the rotor and the stator in opposite directions, wherein rotation of the rotor and the stator causes the first and second drive trains to rotate.

* * * * *